(12) United States Patent
Berning et al.

(10) Patent No.: US 12,159,978 B2
(45) Date of Patent: Dec. 3, 2024

(54) MOBILE ENERGY SUPPLY SYSTEM WITH BATTERY MODULES, BATTERY MODULE AND METHOD FOR OPERATING A MOBILE ENERGY SUPPLY SYSTEM

(71) Applicant: instagrid GmbH, Ludwigsburg (DE)

(72) Inventors: Sebastian Berning, Stuttgart (DE); Andreas Sedlmayr, Pforzheim (DE)

(73) Assignee: instagrid GmbH, Ludwigsburg (DE)

( * ) Notice: Subject to any disclaimer, the term of this patent is extended or adjusted under 35 U.S.C. 154(b) by 0 days.

(21) Appl. No.: 17/737,395

(22) Filed: May 5, 2022

(65) Prior Publication Data
US 2022/0359918 A1    Nov. 10, 2022

(30) Foreign Application Priority Data
May 6, 2021  (DE) ..................... 10 2021 111 867.0

(51) Int. Cl.
| | |
|---|---|
| *H01M 10/42* | (2006.01) |
| *H01M 10/627* | (2014.01) |
| *H01M 10/655* | (2014.01) |
| *H01M 50/204* | (2021.01) |
| *H01M 50/251* | (2021.01) |
| *H02J 7/00* | (2006.01) |

(52) U.S. Cl.
CPC ..... *H01M 10/4257* (2013.01); *H01M 10/627* (2015.04); *H01M 10/655* (2015.04); *H01M 50/204* (2021.01); *H01M 50/251* (2021.01); *H02J 7/0013* (2013.01); *H01M 2010/4271* (2013.01); *H01M 2220/10* (2013.01)

(58) Field of Classification Search
CPC ........... H01M 10/4257; H01M 10/627; H01M 10/655; H01M 50/251; H01M 50/204
See application file for complete search history.

(56) References Cited

U.S. PATENT DOCUMENTS

| | | |
|---|---|---|
| 8,994,336 B2 | 3/2015 | Brotto et al. |
| 10,044,069 B2 | 8/2018 | Despesse |
| (Continued) | | |

FOREIGN PATENT DOCUMENTS

| | | |
|---|---|---|
| DE | 102011002548 A1 | 7/2012 |
| DE | 102019110177 A1 | 10/2020 |
| DE | 102019215287 A1 | 4/2021 |

*Primary Examiner* — Karie O'Neill Apicella
(74) *Attorney, Agent, or Firm* — The Webb Law Firm (57) ABSTRACT

A mobile, in particular portable, energy supply system having battery modules which can be connected in series in a controllable manner in order to provide different voltages at a power supply connection of the energy supply system, and a control unit for controlling the battery modules, wherein each battery module has an input connection and an output connection, a battery unit for providing a module voltage and switching elements, in particular power electronic ones. The switching elements are designed to selectively switch the module voltage for the provision of energy to the input and output connection, wherein a heat-transferring coupling between the switching elements and the battery unit is provided to transfer operationally generated heat loss of the switching elements specifically from these to the battery unit. A battery module for an energy supply system and a method for operating such an energy supply system are also related.

18 Claims, 3 Drawing Sheets

(56) References Cited

U.S. PATENT DOCUMENTS

2015/0044520 A1* 2/2015 Feuerstack .......... H01M 10/615
                                                        429/50
2019/0214606 A1* 7/2019 Kurcik ................ H01M 50/271
2021/0143657 A1* 5/2021 Zagrodnik .......... H01M 10/615

* cited by examiner

MOBILE ENERGY SUPPLY SYSTEM WITH BATTERY MODULES, BATTERY MODULE AND METHOD FOR OPERATING A MOBILE ENERGY SUPPLY SYSTEM

CROSS-REFERENCE TO RELATED APPLICATIONS

This application claims priority to German Patent Application No. 10 2021 111 867.0, filed on May 6, 2021, the contents of which are hereby incorporated by reference in their entirety.

TECHNICAL FIELD

The disclosure relates to a mobile energy supply system with a plurality of battery modules, a battery module for an energy supply system, and a method for operating an energy supply system according to the claims.

BACKGROUND

For the mobile power supply of high-performance work machines, such as e.g. diamond drill, high-pressure cleaners or industrial vacuum cleaners, power generators with combustion engines are used almost exclusively today. This applies in particular to machines having an electrical input power of more than 1 kW. Due to the increasing environmental pollution and health risk from exhaust gases and noise, it is desirable to operate such devices with battery storage.

A practicable solution is portable battery storage, which provides a standard AC voltage directly at an output, for example 230 V/50 Hz or 115 V/60 Hz. This output can, for example, be designed as a plug-in device to which commercial mains consumers can be connected. Such battery storage devices are available on the market today in a large number of different designs. However, the devices available have disadvantages that significantly limit their use. Their technical design moves in a field of tension between output power and weight. Battery storage with a high output power >2.5 kW with a weight >20 kg can usually no longer be carried by one person in terms of current occupational safety regulations or offer insufficient storage capacity (<1 kWh). Although battery storage devices with a lower output power are lighter, they cannot be used for the applications described.

In addition to the average output power provided, the so-called overload capacity also plays a role. Commercially available battery storage typically provides 50% more power for a short time (a few seconds) than in continuous operation. But large consumers such as those with so-called capacitor motors (single-phase asynchronous machines), require up to ten times more power to start. While this is not a problem on the mains, there is no solution for mobile operation with batteries.

U.S. Pat. No. 8,994,336 B2 describes a further development in which the battery cells are arranged in series in such a way that their voltage is above the peak voltage of the AC voltage to be generated. This improves both the overload capacity and the power density of the battery storage. However, an inverter of conventional design is still used to generate the AC voltage. A charger for the batteries is also further used, which increases the weight of the battery storage.

It turns out that the limitation of the power density of the energy storage system mainly results from the thermal limitation of this very inverter. Semiconductor switches are used as the central functional unit of a conventional inverter, e.g. MOSFETs, which are dimensioned such that they can switch at least the peak voltage of the AC voltage generated. In practice, this so-called blocking voltage is usually chosen to be significantly higher for reasons of robustness, e.g. 650 V blocking voltage for 230 V AC voltage or 325 V peak voltage. These components have high switching losses and conduction losses, so suitable heat dissipation must be ensured. Heavy heat sinks are used for this, e.g. aluminum, which are responsible for a large part of the weight. For example, if a MOSFET of the current technology generation with 650 V blocking voltage has a line resistance of usually at least $0.1\Omega$, a load of 16 A RMS generates a waste heat of at least $16 A*16 A*0.1 \Omega=25.6$ W per MOSFET as well as dynamic switching losses in the same order of magnitude, whereby usually two switches are connected in series and this heat loss is doubled again, which has to be dissipated from a small area and for this purpose the heat sinks mentioned and often also active cooling in the form of a fan or a liquid cooling circuit are required. The latter further contribute to the increase in weight and have a negative impact on the reliability of the system, since mechanically moving parts typically have a significantly shorter service life than the electronic components of the energy storage system.

The applicant's own DE 10 2019 110 177 A1 describes a mobile energy supply system with improved performance and lower weight. The energy supply system has a large number of battery modules which can be connected in series in a time-variable manner by a central control unit in order to provide an AC voltage at an output of the supply system. Each battery module has an input and an output port, a battery pack, and circuitry that selectively connects the battery pack to the input and output ports.

SUMMARY

Against this background, the disclosure is based on providing a further improved mobile, in particular portable, energy supply system, a battery module for an energy supply system and a method for operating an energy supply system, which are characterized by high reliability, long lifetime and service life. In addition, a high power density, i.e. high electrical performance in a small installation space, is to be provided and the weight and the production costs are to be reduced. The area of application is also to be expanded, e.g. unrestricted use in outdoor areas may be possible.

This is achieved by providing a mobile energy supply system having the features of claim 1, by a battery module for an energy supply system having the features of claim 16 and by a method for operating an energy supply system having the features of claim 17. Further, particularly advantageous embodiments of the disclosure are disclosed in the subclaims.

It should be pointed out that the features listed individually in the claims may be combined with one another in any technically meaningful manner (also beyond category boundaries, for example between method and device) and show further embodiments of the disclosure. The description additionally characterizes and specifies the disclosure, in particular in connection with the figures.

It should also be noted that a conjunction "and/or" used here between two features and linking them is always to be interpreted in such a way that only the first feature may be present in a first embodiment of the subject matter according to the disclosure, in a second embodiment only the second feature may be present and, in a third embodiment, both the first and the second features may be present.

As used herein, a term "about" indicates a tolerance range considered normal by those skilled in the art. In particular, the term "about" means a tolerance range of the related size of up to a maximum of +/−20%, preferably up to a maximum of +/−10%.

Furthermore, within the meaning of the disclosure, relative terms used herein with regard to a feature, for example "larger," "smaller," "higher," "lower," "heavier," "lighter" and the like, are always to be interpreted in such a way that manufacturing and/or performance-related size deviations of the relevant feature, which lie within the manufacturing/performance tolerances defined for the manufacture or performance of the respective feature, are not covered by the respective relative term. In other words, a size of a feature is only to be regarded as "larger," "smaller," "higher," "lower," "heavier," "lighter" and the like in the sense of the disclosure than a size of a comparative feature if the two comparison values differ so clearly from one another in their value that this difference in size certainly does not fall within the production/performance-related tolerance range of the feature in question, but is the result of targeted action.

According to the disclosure, a mobile, in particular portable, energy supply system has a plurality of battery modules which can be connected in series in a controllable manner in order to provide different (i.e. time-variable) voltages at a power supply connection of the energy supply system. The energy supply system also has a control unit, which can be a central control unit of the energy supply system, for controlling the battery modules. Each battery module has an input connection and an output connection, a battery unit for providing a module voltage and a plurality of switching elements, in particular electronic power switches. The switching elements are designed to selectively switch the module voltage to the input and output connection to provide energy. According to the disclosure, a heat-transferring coupling is provided between the switching elements and the battery unit in order to transfer operationally generated heat loss from the switching elements in a targeted manner from these to the battery unit.

It is to be understood that the heat transfer coupling provided in accordance with the disclosure is the result of intentional action, i.e. compared to a heat exchange between a heat source and a heat sink that always takes place naturally over a relatively long period of time (e.g. minutes to hours), causes a significant increase in the effective heat transfer from the switching elements (heat source) to the battery unit (heat sink).

The disclosure makes use of the knowledge that the thermal mass of the battery module is substantially given by the mass of the battery unit. Thermal mass is the heat capacity, i.e. the amount of heat that the battery unit can absorb with a specific temperature change.

With the heat transfer coupling provided according to the disclosure between the switching elements and the battery unit, the switching elements (generally the power electronics) can be cooled against the heat capacity of the battery unit. This allows effective passive cooling of the switching elements or power electronics without additional components for heat dissipation such as fans, heat sinks, cooling plates, liquid cooling circuit and the like. As a result, there is no need for mechanical moving parts for cooling, which increases the reliability and service life of the energy supply system. In addition, the energy supply system requires less installation space for the same electrical performance. The weight and manufacturing costs of the power supply system can also be reduced.

As a result, the energy supply system according to the disclosure achieves a considerable improvement in the power density compared to the prior art. Thus, for the first time, a portable weight and unrestricted performance compared to a mains connection, especially with output powers greater than 0.5 kW, can be combined. As a portable energy supply system, this has a weight of less than 25 kg, preferably less than 15 kg.

A different voltage at the power supply connection is understood to mean an electrical voltage at the power supply connection that varies over time. Different voltages can be generated at the power supply connection, for example by effectively connecting a changing number of battery modules (possibly also with changing polarity) to the power supply connection at the same time in order to generate an AC voltage (e.g. 230 VAC).

Changing between different battery modules while maintaining the same total number of active battery modules simultaneously at the power supply connection, for example to provide a DC voltage, can lead to a change in the voltage at the power supply connection in the sense of the disclosure. Such a change can take place, for example, in order to compensate for changing module voltages depending on the current state of charge (SoC) of the respective battery modules. Of course, a DC voltage provided at the power supply connection can also be provided by changing the battery modules that are actively connected to the power supply connection at the same time, in order to provide a connected consumer with DC voltage levels that vary over time, for example.

The power supply connection of the energy supply system can serve as an output connection to which electrical consumers can be connected and supplied with electrical energy from the battery modules for their operation. In addition, the power supply connection can optionally also serve as an input connection to which a system-external electrical energy source, for example a conventional power supply network, can be connected in order to charge the battery modules if the battery unit is a rechargeable battery unit. It is to be understood that, if necessary, a separate charging connection can also be provided in addition to the power supply connection on the energy supply system in order to charge the battery units using the system-external energy source.

Power electronic switching elements are to be understood in particular as such electronic components that are set up to convert electrical energy, for example rectifying or inverting, and/or to optionally supply electrical energy to an electrical consumer, i.e. to electrically connect (switch on) the consumer to an energy source (e.g. battery unit of the battery module) or separate the consumer from it (switch it off).

In order to switch the module voltage of the battery unit selectively to the input and output connection of the respective battery module, the switching elements can be connected, for example, in a bridge circuit that is provided between the input connection and the output connection of the battery module and is set up, to either connect the battery unit to the input and output connection or to connect the input terminal to the output terminal by bypassing the battery unit. The battery unit can be connected to the input and output connection of the battery module with only a single predetermined polarity (e.g. positive or negative polarity) or alternatively with a first polarity (e.g. positive polarity) and a second, inverted polarity (e.g. negative polarity).

However, the disclosure is not limited to such a bridge circuit. Other circuit arrangements of the switching elements for selectively connecting the battery unit to the input and output connection of the battery module can also be provided.

According to an advantageous embodiment of the subject matter of the disclosure, the switching elements are arranged in close proximity to the battery unit such that the smallest distance between at least one of the switching elements and the battery unit (e.g. outer wall of the battery unit) is no more than 10 mm. For example, the switching elements can be arranged together as a group of switching elements on a printed circuit board, possibly additionally, but without being necessarily limited to this, with a control device, a battery management system, a driver circuit and the like, wherein the printed circuit board is arranged accordingly in the aforementioned spatial proximity to the battery unit. In this way, a thermally close coupling of the switching elements to the battery unit is achieved in a targeted manner in order to effectively provide the desired heat transfer from the switching elements to the battery unit, even if an air gap remains in a space between the switching elements or the printed circuit board and the battery unit, i.e. the switching elements themselves have no direct physical contact with the battery unit.

The switching elements and the battery unit can form a structural unit. In particular, the switching elements and the battery unit can form a direct physical contact here in order to further improve the heat transfer performance. For example, the switching elements can be arranged together on a printed circuit board, if necessary additionally, but without being necessarily limited to this, with a control device, a battery management system, a driver circuit and the like, wherein the printed circuit board is able to be arranged or fastened to a housing of the battery unit. The switching elements or the printed circuit board can also be accommodated in a housing of the battery unit itself.

According to an advantageous development of the subject matter of the disclosure, the switching elements (or a printed circuit board carrying them) and the battery unit are connected to one another, in particular thermally coupled, via at least one heat-conducting body which contacts them in each case. The heat conducting increases the heat dissipation from the switching elements to the battery unit due to its much higher thermal conductivity than, for example, air. In addition, the heat-conducting body enables heat to be emitted to the battery unit evenly both in terms of time and space. This effectively prevents local heat peaks on the battery unit, which in turn has a positive effect on the service life of the battery unit.

In a further advantageous embodiment of the disclosure, the heat-conducting body is electrically conductive and provides an electrical connection for transmitting the module voltage of the battery unit to the switching elements (and possibly a control circuit controlling the switching elements). The heat conducting body is formed from a material with good thermal conductivity, for example from metal such as aluminum.

Preferably, the heat-conducting body can have a maximum length of about 10 mm, based on a current path between the battery unit and the switching elements, in order to reduce parasitic inductance caused by the heat-conducting body, which improves both the switching behavior of the switching elements and the radiation behavior (EMC). If the switching elements together are, for example, arranged as a switching element group on a printed circuit board (possibly additionally, but not necessarily limited to this, with a control device, a battery management system, a driver circuit and the like), the bridging distance from the battery unit (i.e. from the supply connections of the battery unit) is understood to be below the length of the heat conducting body up to the circuit board (i.e. up to the circuit board connection). On the printed circuit board, the switching elements can also be arranged further away from the printed circuit board connection (e.g. approximately 10 to 60 mm), without this distance from the printed circuit board connection having to be taken into account in the length of the heat-conducting body in this case. Suitable measures such as a potting material enclosing the switching elements (preferably with good thermal conductivity properties) and/or a metallic shielding (e.g. copper layer) can also be provided on the printed circuit board to further improve the EMC properties.

According to a further advantageous embodiment, the switching elements are designed to generate a dynamic power loss during operation at a nominal operating point, which is at least 2 to 5 times smaller, preferably at least 10 times smaller than a power loss of the battery unit. The nominal operating point is an operating point of the energy supply system at which a maximum continuous electrical power, e.g. between about 1 kW and about 4 kW system output power or between about 50 W and about 250 W average module output power over a longer period of, for example, about 30 to about 240 minutes can be delivered to a connected consumer. The factor mentioned above means that the heating of the switching elements or the power electronics is very small compared to the self-heating of the battery unit, so that the switching elements (or power electronics) in the manner disclosed herein against the thermal capacity of the battery unit can be cooled substantially without any adverse temperature influence for the battery unit, i.e. the heat loss of the switching elements/power electronics can be distributed over the battery unit. Despite delivering the maximum permissible continuous discharge current, the thermal switch-off point of the battery unit is not reached before the cells are completely discharged (end-of-discharge voltage).

Furthermore, the switching elements can preferably be designed to generate a static power loss of at most 1 W, preferably less than 500 mW. If the switching elements are arranged on a printed circuit board, for example together with a control device and/or a battery management system and/or a driver circuit or the like, the aforementioned maximum static power loss can also relate to all components that are located on the printed circuit board. In contrast to the dynamic power loss, which substantially only occurs for the time of power output (see previous embodiment), the static power loss of the switching elements or the circuit board increases the temperature of the battery unit or the battery module permanently, i.e. while the energy supply system is switched on, even when there is no output power. The limitation of the static power loss of the switching elements (or the printed circuit board) to a maximum of 1 W, preferably less than 500 mW, leads to a much lower heating of the battery unit (e.g. only to 25° C. instead of to 40° C.), whereby the service life of the battery unit is increased.

According to yet another advantageous embodiment of the disclosure, the switching elements are designed as MOSFET switches, preferably as N-channel MOSFET switches, which each have a breakdown voltage in a range from approximately 30 V to approximately 100 V. This represents an optimal choice in terms of the size of the energy supply system, the thermal losses of the switching elements and the system complexity, which also enables the passive cooling of the switching elements on the battery unit disclosed herein and at the same time reduces the number of switching elements to be used.

By reducing the thermal losses of the switching elements, higher efficiency is also achieved in the voltage conversion. As a result, the electrical energy stored in the battery modules or battery units can be used even better, which leads to a longer operating time/service life. This is particularly advantageous in mobile applications, since the amount of energy carried is limited and the energy density of the battery units directly influences the weight of the energy supply system.

Each MOSFET switch preferably has a direct current internal resistance of at most 5 mΩ, as a result of which the thermal losses of the switching elements can again be significantly reduced.

Each battery unit can have multiple battery cells. Preferably used battery cells are, for example, lithium-ion cells, wherein the disclosure is not necessarily limited to this cell type. In a particularly advantageous manner, each battery unit has a maximum number of battery cells such that the total mass of the battery unit is at most 1 kg, which substantially forms the thermal mass of the battery unit or battery module. Increasing the mass of the battery pack increases the thermal capacity of the battery pack that can be used for switch cooling, but also increases the system weight, which compromises the portability of the system. It has been recognized that the aforementioned number of battery cells per battery unit achieves an optimal compromise in this regard.

Furthermore, the battery unit can have a maximum of 14 battery cells, wherein the number of battery cells preferably is limited to a maximum of 6. This makes it possible to use switching elements (e.g. semiconductor switches such as MOSFET) with a lower blocking voltage. The blocking voltage of the switching elements does not have to be designed for the blocking voltage of the generated system output voltage, but only for the maximum voltage of a battery module. For a battery module having, for example, six lithium-ion cells connected in series, the maximum module voltage is, for example, 6*4.2 V=25.2 V. A semiconductor switch with a blocking voltage of, for example, 40 V can therefore be used. Such a component has at the same size, for example, lower static losses by a factor of 100 than a semiconductor switch with 650 V blocking voltage. As a result, the local heat development is reduced by a factor of 100. In the case of a semiconductor switch with a volume resistance of 1 mΩ in the closed state and a current of 16 A, this results in only around 0.25 watts of heat being generated per switching element. As described herein, this heat output can be dissipated passively against the battery pack, so that no heat sink and the like is required. This significantly reduces the weight.

In addition to the reduction in weight, the reduction in thermal losses also results in greater efficiency in voltage conversion.

As a result, the electrical energy stored in the battery cells or the battery unit can be better used, which leads to a longer service life of the energy supply system. This is particularly advantageous in mobile applications, since the amount of energy carried is limited and the energy density of the battery units directly influences the weight of the energy supply system.

Each battery cell can have an internal resistance of at most 40 mf, wherein an internal resistance of at most 20 mΩ is particularly preferred. The low internal resistance means that the battery unit heats up significantly less than the semiconductor switches. As a result of the thermally favorable coupling of the switching elements to the battery unit disclosed herein, the waste heat from the switching elements can therefore be dissipated directly to the large heat capacity of the battery unit. This enables passive cooling of the switching elements over the entire discharging period of the battery modules, i.e. the switching elements can dissipate sufficient thermal energy to the battery unit during the entire discharging process without the maximum permissible operating temperature of the battery cells/battery unit or the switching elements being exceeded. With a suitable design, this is also ensured under unfavorable ambient conditions, for example at elevated ambient temperatures or in direct sunlight.

According to a further advantageous embodiment of the disclosure, the battery module has a housing that accommodates the battery unit and the switching elements. In other words, the switching elements and the battery unit form a structural unit with the advantages described herein.

Due to the sufficient passive cooling of the switching elements on the battery unit, the housing can be hermetically sealed, since no openings are required, for example for an exchange of air with the environment. This leads to a significantly reduced susceptibility to dirt and moisture, so that the reliability is further increased and the possible area of application of the energy supply system is further increased. For example, unrestricted use outdoors and even under water (waterproof housing) is possible.

According to a further aspect of the disclosure, a battery module for an energy supply system, in particular for an energy supply system according to one of the configurations disclosed herein, has an input connection and an output connection, a battery unit for providing a module voltage and a plurality of switching elements, in particular electronic power switches. The switching elements are designed to selectively switch the module voltage to the input and output connection to provide energy. According to the disclosure, a heat-transferring coupling is provided between the switching elements and the battery unit in order to transfer operationally generated heat loss from the switching elements to the battery unit.

With regard to the definitions of terms related to the battery module according to the disclosure and the effects and advantages of its features, reference can be made in full to the disclosure of analogous definitions, effects and advantages of the energy supply system according to the disclosure. Accordingly, disclosures herein regarding the energy supply system according to the disclosure can also be used analogously to define the battery module according to the disclosure and vice versa, unless this is expressly excluded. In this respect, a repetition of explanations of the same features, their effects and advantages can be dispensed with in favor of a more compact description, without such omissions having to be interpreted as a restriction.

According to a further aspect of the disclosure, a method for operating an energy supply system, in particular an energy supply system according to one of the configurations disclosed herein, has the steps:

Provision of a plurality of battery modules that can be controlled in series,

Activation of the battery modules to provide different voltages at a power supply connection of the energy supply system, and Optional switching of a module voltage provided by one battery unit of each battery module to an input and output connection of the battery module by means of several, in particular power electronic, switching elements in order to provide electrical energy at the input and output connection of the battery module, wherein operationally generated heat loss of the switching elements is transferred from these to the battery unit by means of a heat-transferring coupling provided between the switching elements and the battery unit.

Also with regard to method-related definitions of terms and the effects and advantages of method-related features, reference can be made in full to the disclosure of analogous definitions, effects and advantages of the energy supply system or the battery module according to the disclosure. Accordingly, disclosures relating to the energy supply system according to the disclosure and the battery module can also be used analogously to define the method according to the disclosure and vice versa, unless this is expressly excluded. A repetition of explanations of the same features, their effects and advantages can again be dispensed with in favor of a more compact description, without such omissions having to be interpreted as a restriction.

BRIEF DESCRIPTION OF THE DRAWINGS

Further features and advantages of the disclosure result from the following description of embodiments of the disclosure, which are not to be understood as limiting, which are explained in more detail below with reference to the drawing. In this drawing.

DETAILED DESCRIPTION OF THE DRAWINGS

In the different figures, parts that are equivalent with respect to their function are always provided with the same reference symbols, so that they are generally only described once.

Figure 1:
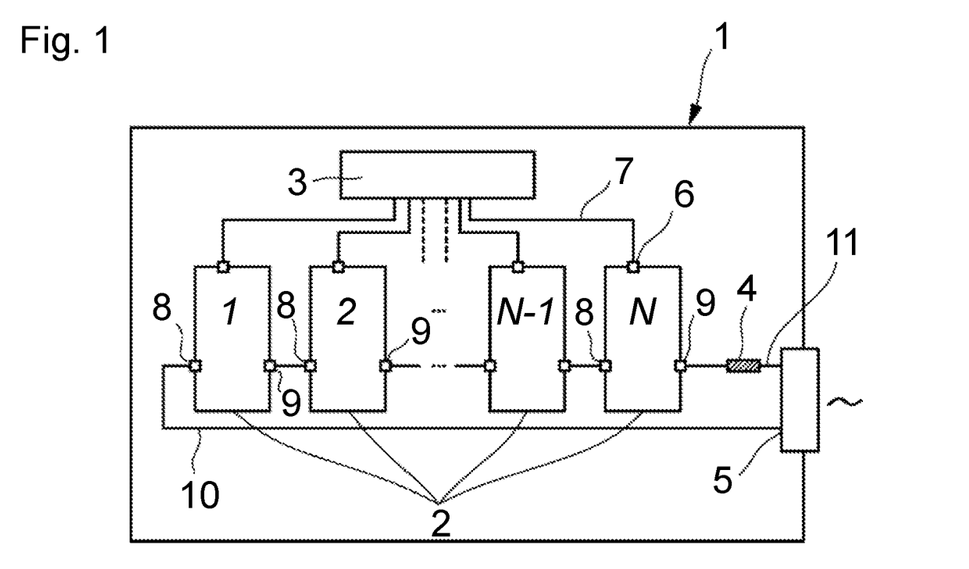
FIG. 1 is a functional diagram of an embodiment of a mobile energy supply system according to the disclosure.

FIG. 1 shows a functional diagram of an embodiment of a mobile energy supply system 1 according to the disclosure. This energy supply system 1 is designed as a mobile unit, in particular as a portable energy supply system, i.e. having a weight and a size that can be handled by one person. The weight of the energy supply system is less than 25 kilograms and the size is such that the energy supply system can be carried as a backpack, for example.

The mobile energy supply system 1 has a number N battery modules 2, which can be connected in series in a controllable manner. The individual battery modules 2 are controlled via a control unit 3, which in the present case is a central control unit of the energy supply system 1, but without limitation. The total voltage output by the series-connected battery modules 2 is smoothed, for example, via a smoothing reactor 4 and is present at a power supply connection 5, which can be designed as a plug-in device, for example. The plug-in device can be a standardized plug-in connection, for example for 230 V AC devices, but is not necessarily limited to this.

As can be seen from FIG. 1, each of the N battery modules 2 have a control connection 6 via which the control device 3 can transmit a control signal via a control line 7. Furthermore, each battery module 2 has a module input 8 and a module output 9. It should be noted that "input" and "output" are named arbitrarily. In particular when the polarity of the battery modules 2 can be controlled, "input" and "output" cannot be functionally differentiated from one another. With suitable control, two inputs 8 or outputs 9 can also be connected to one another in the series circuit.

The N battery modules are arranged in such a way that the module output 9 of a battery module 2 is electrically connected to the module input 8 of the subsequent battery module 2. The module input 8 of the first battery module 2.1 is electrically connected to the power supply connection 5 via a line section 10, and the module output 9 of the last battery module 2.N is electrically connected to the power supply connection 5 via the smoothing reactor 4 and another line section 11, so that the dispensed output voltage of the power supply system 1 between module input 8 of the first battery module 2.1 and the module output 9 of the last battery module 2.N is present.

In order to provide different voltages at the power supply connection 5 of the energy supply system 1, for example to generate a substantially sinusoidal AC voltage at the output 5, the battery modules 2 are periodically controlled by the control unit 3 so that optionally none, one or more battery modules 2 are effectively connected to the power supply connection 5 to provide energy at the system output 5.

For this purpose, the battery modules 2 can be interconnected, for example, in what is known as a bridge circuit, which is provided between the input connection and the output connection of the battery module and is set up to either connect the battery unit 12 to the input and output connection 8, 9 (also referred to herein as battery mode) or to connect the input port 8 to the output port 9 by bypassing the respective battery pack 12 (also referred to herein as bypass mode). Thus, the individual battery modules 2 can periodically switch from a battery mode to a bridging mode and vice versa under the control of the control unit 3. In the battery mode, the module voltage of a battery unit 12 (FIG. 2) of the battery module 2 is present between the module input 8 and the module output 9 of a battery module 2. In the bridging mode, on the other hand, module input 8 and module output 9 are electrically connected to one another, so that there is no module voltage between these points.

By successively switching the battery modules 2 from the bridging mode to the battery mode, the output voltage can consequently be increased in stages by the module voltage of a battery module 2. To the same extent, the output voltage can be gradually reduced again by successively switching back to the bypass mode. The possible voltages at the output are therefore between 0 V and N times the module voltage of a battery module 2.

A substantially sinusoidal voltage curve can be provided at the power supply connection 5 by smoothing, if necessary, this stepped voltage curve.

It should be mentioned that several of the N battery modules 2 can be switched back and forth simultaneously between bridging mode and battery mode. It should also be noted that the generation of only one half-wave was described above. The other half-wave can be generated in the same way, wherein the polarity of the battery modules 2 is able to be reversed at their respective input and output connections 8, 9, for example.

Figure 2:
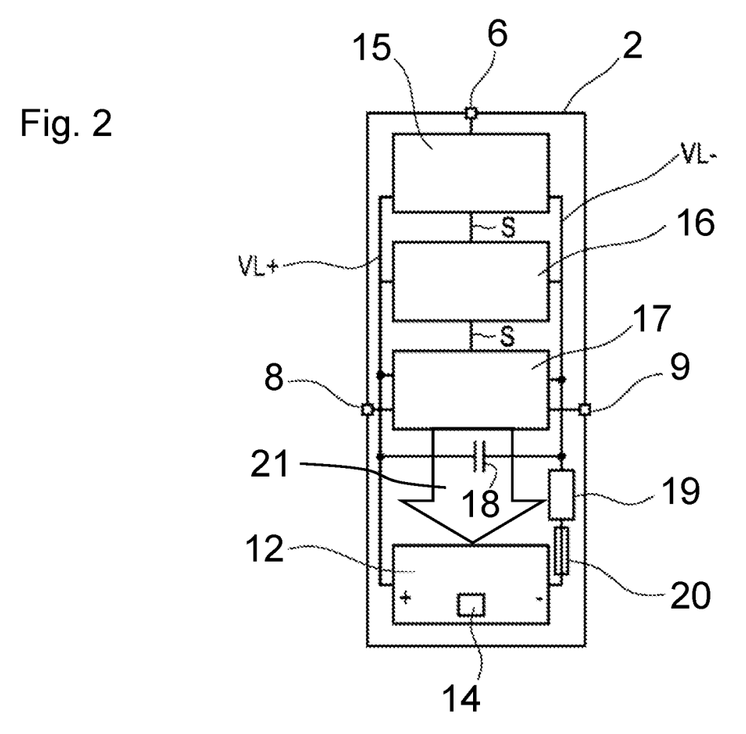
FIG. 2 is a functional diagram of a battery module of the energy supply system from FIG. 1.

FIG. 2 shows the basic structure of a battery module 2 of the energy supply system 1 from FIG. 1 in a functional diagram. As can be seen, the battery module 2 has a battery unit 12, which in turn has one or more battery cells, preferably rechargeable battery cells 13 (FIG. 3), such as lithium-ion cells. Furthermore, the battery unit 12 can have a battery cell monitoring unit 14. The battery cell monitoring unit 14 monitors the cell voltages of the individual battery cells 13.

Figure 3:
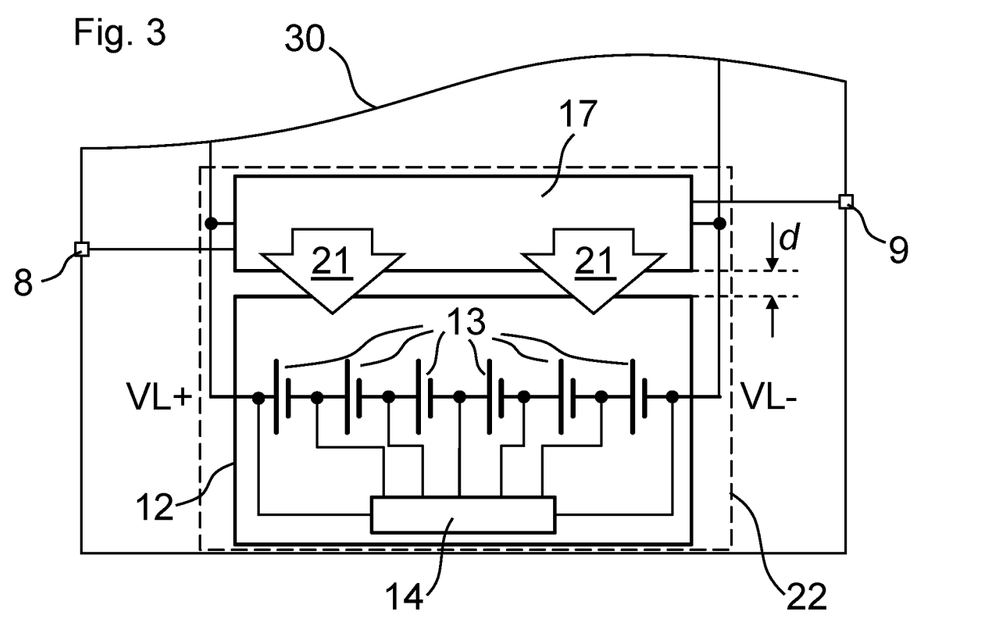
FIG. 3 is a partial view of an embodiment of a battery module according to the disclosure for a power supply system.
Figure 4:
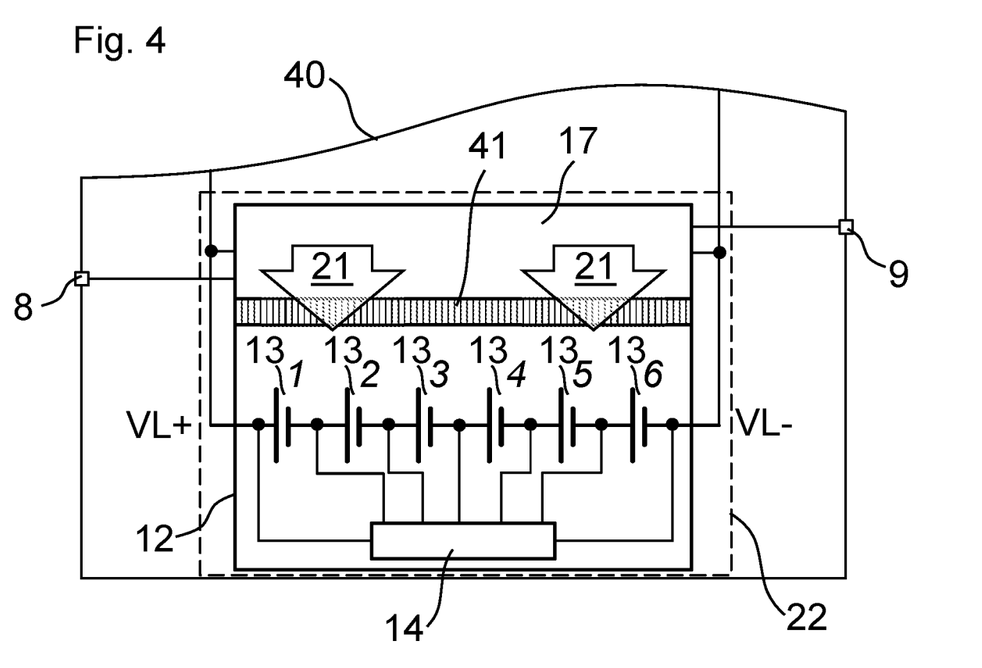
FIG. 4 is a partial view of a further embodiment of a battery module according to the disclosure for a power supply system.

The battery unit 14 is shown in detail in FIGS. 3 and 4 by way of example. In the present case, it has six battery cells 13.1 to 13.6, which are connected in series. It is understood that the number of battery cells 13 is not necessarily limited to six. The battery unit can also have more or fewer than six battery cells 13. Furthermore, the battery cell monitoring unit 14 is connected to the individual battery cells 13.1-13.6 in such a way that the respective cell voltage can be detected. The battery cell monitoring unit 14 is supplied with power from the battery unit 12 itself, preferably via two external supply taps VL+ and VL−.

As can also be seen from FIG. 2, the battery module 2 has an insulation device 15, a control device 16, several switching elements 17 and a capacitor 18, which are arranged parallel to one another and to the battery unit 12 and are connected electrically via two supply lines VL+, VL to the battery unit 12. In addition, a disconnecting device 19 and a fuse 20 connected in series are provided in one or both supply lines VL+, VL−. It is to be understood that the battery module 2 does not necessarily have to have all/the components shown in FIG. 2. The battery module 2 can also have alternative or additional components (not shown).

It can be seen from FIG. 2 that the isolation device 15 has an input connected to the control connection 6 of the battery module 2 in order to be able to receive a control signal, e.g. from the central control unit 3. Such a control signal can be forwarded via a control line S from the isolation device to the control device 16. A control signal can in turn be transmitted from the control device 16 via a control line S to the switching elements 17.

It can also be seen from FIG. 2 that the module input 8 and the module output 9 are each electrically connected to the switching elements 17.

When the switching elements 17 are connected to the bridge circuit mentioned herein, the bridge circuit connects the voltage line VL+ to the module input 8 and connects the voltage line VL− to the module output 9 in the battery mode. The voltage provided by the battery unit 12, for example 3.6 V for a single lithium-ion cell, is therefore present at the module input 8 and the module output 9. In the bridging mode, on the other hand, the bridge circuit creates an electrical connection between the module input 8 and the module output 9 so that the battery unit 12 is decoupled and the battery module 2 itself does not provide any voltage between the module input 8 and the module output 9. The basic structure of such a bridge circuit is well known per se and therefore does not need to be described in more detail.

The isolation device 15 can provide a galvanic isolation between the battery module 2 and the control unit 3. The galvanic separation can take place, for example, by means of an inductive coupling device or, for example, by means of an optocoupler (both not shown).

The fuse 20 in the supply line VL− can be provided in order to disconnect the battery unit 12 if the current flow is too high. Alternatively, the isolating device 19 and/or the fuse 20 can also be provided in the supply line VL+.

The separating device 19 can be provided in order to separate the battery unit 12 from one or more of the other elements, such as the isolating device 15, control device 16, switching elements 17 and capacitor 18, if necessary. This separation can be controlled, for example via a control signal from the control unit 3. In the present case, all elements are separated. However, it is also conceivable, for example, to separate only the switching elements 17 from the battery unit 12. The isolating device 19 itself may have one or more switching elements (not shown), for example in the form of a MOSFET transistor. The switching elements of the separating device 19 can substantially be the same components as the switching elements 17 without being necessarily restricted to this.

It can also be seen from FIG. 2 that a heat-transferring coupling 21 is provided between the switching elements 17 and the battery unit 12 in order to transfer operationally generated heat loss from the switching elements 17 to the battery unit 12 in a targeted manner, as is indicated by the arrow in FIG. 2.

For operation of an energy supply system, such as the energy supply system 1 from FIG. 1, a plurality of battery modules, e.g. modules 2, are provided connected in series in a controllable manner. The battery modules are controlled (e.g. by means of the control unit 3) in order to have different voltages at a power supply connection, e.g. connection 5, of the power supply system. Optionally, a module voltage (e.g. VL+, VL−) provided by each battery unit, e.g. battery unit 12, of each battery module, to an input connection (e.g. module input 8) and output connection (e.g. module output 9) of the battery module by means of several, in particular power electronic, switching elements, e.g. switching elements 17, is connected to provide electrical energy at the input and output terminal of the battery module. By means of a heat-transferring coupling provided between the switching elements and the battery unit, e.g. coupling 21, operationally generated heat loss of the switching elements is specifically transferred from them to the battery unit.

Figure 5:
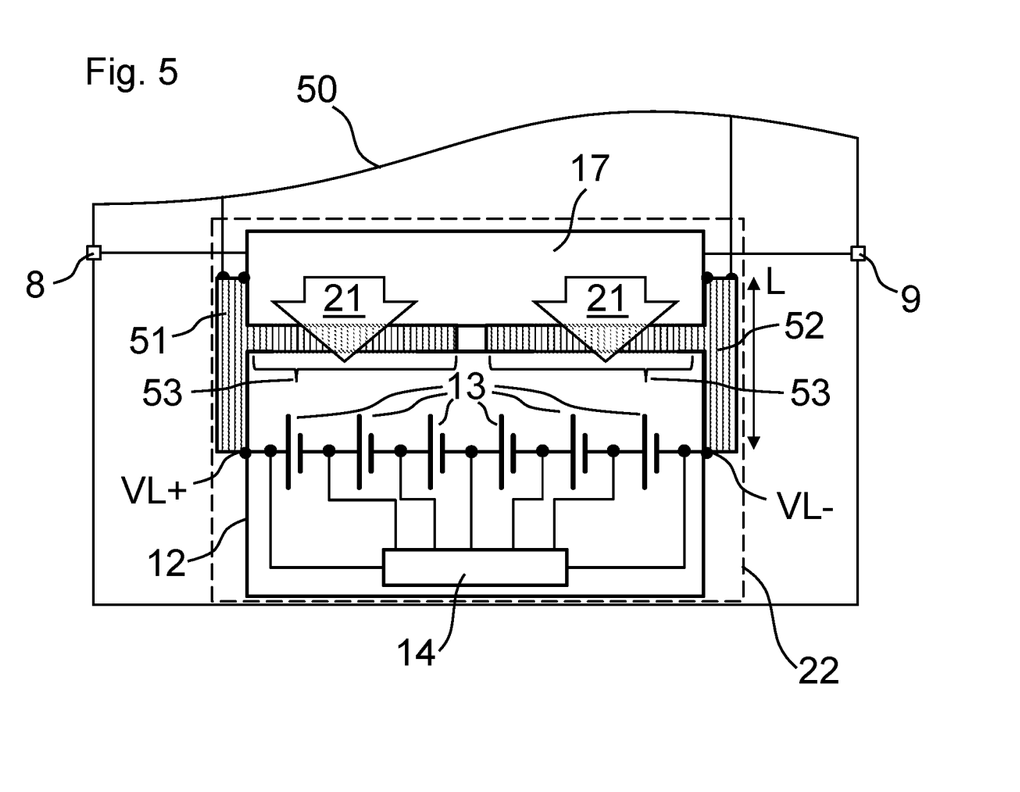
FIG. 5 is a partial view of yet another embodiment of a battery module according to the disclosure for a power supply system.

FIGS. 3, 4 and 5 each represent partial views of different embodiments of a battery module, e.g. the battery module 2 of FIGS. 1 and 2, according to the disclosure for an energy supply system, e.g. the energy supply system 1 from FIG. 1.

FIG. 3 shows a first embodiment of a battery module 30 which, without being necessarily limited thereto, can be constructed substantially like the battery module 2 from FIG. 2, wherein the switching elements 17 of the battery module 30 are arranged in spatial proximity to the battery unit 12 in such a way that a smallest distance d between at least one of the switching elements 17 and the battery unit 12 is no more than about 10 mm in order to effect the targeted heat transfer from the switching elements 17 to the battery unit 12 as described in detail herein.

The switching elements 17 and the battery unit 12 can form a structural unit or can be arranged or fastened in the battery module 30 spatially separated from one another.

The switching elements 17 can be arranged or attached to a housing (not shown) of the battery unit 12.

The battery module 30 can have a housing 22 accommodating the battery unit 12 and the switching elements 17, which can be hermetically sealed, but is not necessarily limited to this.

FIG. 4 shows a second embodiment of a battery module 40 which, without being necessarily limited to this, can be constructed substantially like the battery module 2 from FIG. 2, wherein the switching elements 17 and the battery unit 12 are connected via a heat-conducting body 41. In the present case, the heat-conducting body 41 is inserted into an intermediate space between the switching elements 17 and the battery unit 12, but is not necessarily limited to this. Other arrangements of the heat-conducting body 41 for thermally coupling the switching elements 17 and the battery unit 12 are also conceivable. The heat conducting body 41 is formed from a material with good thermal conductivity, for example from metal such as aluminum, but is not necessarily limited to this. Other materials with good heat transfer properties can also be used as the heat conducting body 41.

FIG. 5 shows a third embodiment of a battery module 50 which, without being necessarily limited to this, can be constructed substantially like the battery module 2 from FIG. 2, wherein the switching elements 17 and the battery unit 12 are interconnected via two heat-conducting bodies 51 and 52. The heat-conducting bodies 51 and 52 are each made of a material with good thermal conductivity and are electrically conductive in the present example (e.g. made of metal such as aluminum), since in the present case they provide an electrical connection for transmitting the module voltage between the battery unit 12 and the switching elements in addition to the heat transfer function 17. For this purpose, the heat-conducting body 51 of the battery module 50 is electrically connected to the output tap VL+ of the battery unit 12 and to a corresponding first input connection of the switching elements 17. The heat-conducting body 52 of the battery module 50, on the other hand, is electrically connected to the output tap VL− of the battery unit 12 and to a corresponding second input connection of the switching elements 17.

In addition, in the battery module 50 shown in FIG. 5, a body portion 53 of the heat-conducting bodies 51, 52 extends into a space between the switching elements 17 and the battery unit 12 in order to produce a large-area heat-conducting contact between them and thus achieve an even distribution of the heat dissipated from the switching elements 17 to the battery unit 12. However, it should be understood that this body portion 53 of the heat-conducting bodies 51 and 52 is not absolutely necessary. For example, the switching elements 17 can also be arranged on the battery unit 12 in such a way that there is no gap available for inserting a body portion 53 as shown in FIG. 5. For example, the heat-conducting bodies 51 and 52 in the illustration in FIG. 5 could each only run laterally outwards, and the switching elements 17 and the battery unit 12 could be arranged so as to be both thermally and electrically coupled to one another.

A length of each heat-conducting body 51, 52 based on a current path between the battery unit 12 and the switching elements 17 is preferably a maximum of approximately 10 mm. In FIG. 5, this substantially corresponds to the length L drawn in between the respective connections VL+ or VL− and the corresponding input connections of the switching elements 17. It is to be understood that the switching elements together can be arranged, for example as a switching element group on a printed circuit board (not shown), (possibly additionally, but without mandatory limitation to this, with a control device, battery management, a driver circuit and the like), in which case the length L of the heat-conducting body is the bridging distance from the battery unit 12 (i.e. from the supply terminals VL+, VL−) to the printed circuit board (i.e. to the printed circuit board connection) (as can be seen in FIG. 5). On the printed circuit board, the switching elements can also be arranged even further away from the printed circuit board connection, without this distance from the printed circuit board connection having to be taken into account in the length L of the heat-conducting body in this case.

The energy supply system according to the disclosure disclosed herein, the battery module and disclosed methods according to the disclosure for operating an energy supply system are not limited to the embodiments described in each case, but also include other embodiments which have the same effect and which result from technically meaningful further combinations of the features of the energy supply system described herein, the battery module as well as the method. In particular, the features and feature combinations mentioned above in the general description and the description of the figures and/or shown alone in the figures can be used not only in the combinations explicitly stated herein, but also in other combinations or on their own, without going beyond the scope of the present disclosure.

In a preferred embodiment, the energy supply system according to the disclosure is used as a portable energy supply system for the mobile power supply of high-performance work machines, in particular with an electrical input power of more than 1 kW, e.g. diamond drills, pressure washers, industrial vacuum cleaners and the like.

The invention claimed is:

1. A mobile energy supply system having a plurality of battery modules configured to be connected in series in a controllable manner to provide different voltages at a power supply connection of the energy supply system, and a control unit for controlling the battery modules, wherein each battery module has an input connection and an output connection, a battery unit for providing a module voltage and several, power electronic, switching elements, wherein the switching elements are designed to selectively switch the module voltage to the input and output connection to provide energy, wherein a heat-transferring coupling is provided between the switching elements and the battery unit to transfer operationally generated heat loss from the switching elements in a targeted manner from the switching elements to the battery unit.

2. The energy supply system according to claim 1, wherein the switching elements are arranged in close proximity to the battery unit such that the smallest distance between at least one of the switching elements and the battery unit is no more than 10 mm.

3. The energy supply system according to claim 1, wherein the switching elements and the battery unit form a structural unit.

4. The energy supply system according to claim 3, wherein the switching elements are arranged or attached to a housing of the battery unit.

5. The energy supply system according to claim 1, wherein the switching elements and the battery unit are connected by at least one heat-conducting body which makes contact with the switching elements and the battery unit.

6. The energy supply system according to claim 5, wherein the heat-conducting body is electrically conductive and provides an electrical connection for transmitting the module voltage of the battery unit to the switching elements.

7. The energy supply system according to claim 6, wherein a length of the heat-conducting body in relation to a current path between the battery unit 2) and the switching elements is at most 10 mm.

8. The energy supply system according to claim 1, wherein the switching elements are designed to generate a dynamic power loss during operation at a nominal operating point, which is at least 2 to 5 times smaller than a power loss of the battery unit.

9. The energy supply system according to claim 1, wherein the switching elements are designed to generate a static power loss of at most 1 W.

10. The energy supply system according to claim 1, wherein the switching elements are designed as MOSFET switches, which each have a breakdown voltage in a range from 30 V to 100 V.

11. The energy supply system according to claim 10, wherein each MOSFET switch has a maximum DC internal resistance of 5 mΩ.

12. The energy supply system according to claim 1, wherein the battery unit has a plurality of battery cells, wherein the battery unit has a maximum of so many battery cells that the total mass of the battery unit is at most 1 kg.

13. The energy supply system according to claim 12, wherein the battery unit has a maximum of 14 battery cells.

14. The energy supply system according to claim 13, wherein each battery cell has an internal resistance of at most 40 mΩ.

15. The energy supply system according to claim 1, wherein the battery module has a housing accommodating the battery unit and the switching elements.

16. The energy supply system according to claim 15, wherein the housing is hermetically sealed.

17. A battery module for an energy supply system according to claim 1, the battery module comprising: an input connection and an output connection, a battery unit for providing a module voltage and a plurality of power electronic, switching elements, wherein the switching elements are designed to selectively switch the module voltage to the input and output connection to provide energy,
wherein
a heat-transferring coupling is provided between the switching elements and the battery unit in order to transfer operationally generated heat loss from the switching elements in a targeted manner from the switching elements to the battery unit.

18. A method for operating an energy supply system; according to claim 1, the method having the following steps:
provision of a plurality of battery modules that can be switched in series and controlled,
control of the battery modules to provide different voltages at a power supply connection of the energy supply system, and
selective switching of a module voltage provided by one battery unit of each battery module to an input and output connection of the battery module by means of a plurality of switching elements, in particular power electronic ones, in order to provide electrical energy at the input and output connection of the battery module,
wherein
by means of a heat-transferring coupling provided between the switching elements and the battery unit, operationally generated heat loss of the switching elements is specifically transferred from the switching elements to the battery unit.

* * * * *